United States Patent
Park et al.

(10) Patent No.: US 8,049,679 B2
(45) Date of Patent: Nov. 1, 2011

(54) LIQUID CRYSTAL DISPLAY AND METHOD FOR REDUCING VERTICAL LINE DEFECTS

(75) Inventors: Yong-Han Park, Anyang-si (KR); Yong-Koo Her, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 934 days.

(21) Appl. No.: 11/971,325

(22) Filed: Jan. 9, 2008

(65) Prior Publication Data

US 2008/0198121 A1 Aug. 21, 2008

(30) Foreign Application Priority Data

Feb. 21, 2007 (KR) ................ 10-2007-0017409

(51) Int. Cl.
G09G 5/00 (2006.01)
(52) U.S. Cl. .......................... 345/1.1; 345/1.3
(58) Field of Classification Search .......... 345/1.1, 345/1.3, 93
See application file for complete search history.

(56) References Cited

U.S. PATENT DOCUMENTS

| | | | |
|---|---|---|---|
| 2003/0193465 A1* | 10/2003 | Ohkawa et al. | 345/100 |
| 2004/0100431 A1* | 5/2004 | Yoshida | 345/82 |
| 2005/0052383 A1 | 3/2005 | Suzuki | |
| 2005/0190134 A1* | 9/2005 | Wang et al. | 345/87 |
| 2005/0206597 A1* | 9/2005 | Ishii | 345/87 |
| 2005/0253778 A1 | 11/2005 | Ku et al. | |
| 2005/0270009 A1* | 12/2005 | Ohki et al. | 323/298 |
| 2006/0077170 A1 | 4/2006 | Lee et al. | |
| 2007/0018919 A1* | 1/2007 | Zavracky et al. | 345/87 |
| 2007/0057896 A1* | 3/2007 | Natori et al. | 345/98 |

FOREIGN PATENT DOCUMENTS

| | | |
|---|---|---|
| JP | 2005-234056 | 9/2005 |
| JP | 2005-283949 | 10/2005 |
| JP | 2005-331916 | 12/2005 |
| JP | 2005-0351921 | 12/2005 |
| JP | 2006-162664 | 6/2006 |
| JP | 2006-227455 | 8/2006 |
| KR | 1020050028386 A | 3/2005 |
| KR | 1020050042552 A | 5/2005 |
| KR | 1020050072618 A | 7/2005 |
| KR | 1020050079013 A | 8/2005 |
| KR | 1020060064106 A | 6/2006 |
| KR | 1020060083715 A | 7/2006 |
| KR | 1020060112463 A | 11/2006 |
| KR | 1020060112968 A | 11/2006 |

* cited by examiner

*Primary Examiner* — Chanh Nguyen
*Assistant Examiner* — John Kirkpatrick
(74) *Attorney, Agent, or Firm* — Cantor Colburn LLP (57) ABSTRACT

A liquid crystal display ("LCD") includes a first display area, a second display area, a peripheral area outside of the first and second display area, and a dummy pixel unit formed on the peripheral area, wherein the first and second display areas include a plurality of pixels arranged in a matrix each of which has a switching element, and data lines and gate lines connected to the pixels, wherein the data lines include a first data line group positioned on the first and second display areas and a second data line group positioned on the first display area and the dummy pixel unit.

16 Claims, 6 Drawing Sheets

LIQUID CRYSTAL DISPLAY AND METHOD FOR REDUCING VERTICAL LINE DEFECTS

This application claims priority to Korean Patent Application No. 10-2007-0017409, filed on Feb. 21, 2007, and all the benefits accruing therefrom under 35 U.S.C. §119, and the contents of which in its entirety are herein incorporated by reference.

BACKGROUND OF THE INVENTION (a) Field of the Invention

The present invention relates to a liquid crystal display ("LCD") and a method thereof. More particularly, the present invention relates to an LCD having multiple display areas, and a method of reducing defects in the LCD.

(b) Description of the Related Art

In general, a liquid crystal display ("LCD") includes two display panels having pixel electrodes and a common electrode, and a liquid crystal layer having dielectric anisotropy interposed therebetween. The pixel electrodes are arranged in a matrix and connected to switching devices such as thin film transistors ("TFTs") so as to be sequentially applied with data voltages in units of a pixel row. The common electrode is disposed over the entire surface of one display panel and applied with a common voltage. In terms of a circuit, the pixel electrode, the common electrode, and the liquid crystal layer interposed therebetween constitute a liquid crystal capacitor. The liquid crystal capacitor together with the switching element connected thereto becomes a unit of a pixel.

In the LCD, voltages are applied to the two electrodes to generate an electric field at the liquid crystal layer, and the strength of the electric field is controlled to control transmittance of light that passes through the liquid crystal layer, thus obtaining desired images.

In this case, in order to prevent degradation generated as the electric field is applied for a long time in one direction to the liquid crystal layer, polarity of the data voltages with respect to the common voltage is inverted by frames, by rows, or by pixels.

Among the LCDs, a small sized display device used for mobile phones, etc., including a dual display device having outer and inner display panels, is being actively developed. Recently, a dual display device including one display panel that has two display areas, that is, a main display area and a sub-display area instead of the outer and inner display panels, has been under development.

At this time, the two display areas are driven by one driving chip, and share portions of a plurality of data lines that transmit data voltages. As a result, one data line group arranged on two display areas and another data line group arranged on the main display area have different resistance and capacitance, and thereby loads applied to two data line groups are different from each other. Thus, even though the same data voltage is applied to two data line groups, two corresponding pixels supplied with the data voltage have a different transmittance of light, and, in particular, vertical lines are shown in boundary portions of the corresponding pixels.

BRIEF SUMMARY OF THE INVENTION

The present invention provides a display device, such as a liquid crystal display ("LCD"), reducing vertical line defects in a display panel thereof.

The present invention also provides a method of reducing vertical line defects in a display device.

According to exemplary embodiments of the present invention, an LCD includes a first display area, a second display area, a peripheral area outside of the first and second display areas, and a dummy pixel unit formed on the peripheral area, wherein the first and second display areas include a plurality of pixels arranged in a matrix each of which has a switching element, and data lines and gate lines connected to the pixels, the data lines including a first data line group positioned on the first and second display areas and a second data line group positioned on the first display area and the dummy pixel unit.

The gate lines of the second display area may extend to the dummy pixel unit.

The dummy pixel unit may include dummy pixels connected to the gate lines of the second display area and to the data lines of the second data line group, the second data line group includes a plurality of sub-data line groups each of which has a different number of dummy pixels, and as a distance between the first data line group and a sub-data line group increases, the number of dummy pixels within a respective sub-data line group is gradually reduced. Also, the farthest sub-data line group from the first data line group may not be connected to the dummy pixels.

Each dummy pixel may have a same construction as the pixels of the first and second display areas.

The dummy pixel unit may include dummy pixels connected to the gate lines of the second display area and the data lines of the second data line group, and all the data lines of the second data line group may be connected to a same number of dummy pixels.

The pixels of the first and second display areas may further include a pixel electrode connected to the switching element, and a storage electrode line transmitting a common voltage.

The dummy pixels may include a switching element connected to a gate line of the second display area and a data line of the second data line group, and a storage electrode line transmitting the common voltage. The switching element of the dummy pixels may not be connected to a pixel electrode.

A distance between adjacent data lines of the second data line group of the dummy pixel unit may be narrower than a distance between adjacent data lines of the second data line group of the first display area or between adjacent data lines of the first data line group of the second display area.

The LCD may further include a display panel, a driving chip may be attached on the display panel, and the display panel may include the first and second display areas and the dummy pixel unit. The LCD may further include a data driver transmitting data signals to the first and second data line groups, and a gate driver transmitting a gate signal to the gate lines. The driving chip may include the data driver and the gate driver.

A load difference between the first data line group and the second data line group may be substantially reduced by the dummy pixel unit.

According to other exemplary embodiments of the present invention, a display device includes a first display area, a second display area distinct from the first display area, a peripheral area surrounding the first and second display areas, a dummy pixel unit formed on the peripheral area, and a plurality of data lines including a first data line group extending across the first and second display areas and a second data line group extending across the first display area and the dummy pixel unit, wherein the dummy pixel unit reduces a load difference between the first data line group and the second data line group. For example, a load applied to the first data line group may be substantially equal to a load applied to the second data line group.

According to still other exemplary embodiments of the present invention, a method of reducing vertical line defects in a display device having a first display area and a second display area includes extending a first data line group across the first display area and the second display area, extending a second data line group across the first display area and a dummy pixel unit, and substantially minimizing a load difference between the first data line group and the second data line group using the dummy pixel unit.

Substantially minimizing a load difference between the first data line group and the second data line group using the dummy pixel unit may include arranging dummy pixels within the dummy pixel unit, the dummy pixels connected to gate lines of the second display area and data lines of the second data line group, the dummy pixels not including pixel electrodes.

Substantially minimizing a load difference between the first data line group and the second data line group using the dummy pixel unit may include arranging dummy pixels within the dummy pixel unit, a number of dummy pixels arranged closer to the first data line group greater than a number of dummy pixels arranged further from the first data line group.

BRIEF DESCRIPTION OF THE DRAWINGS

Exemplary embodiments of the present invention will be described in detail with reference to the accompanying drawings for clear understanding of features and advantages of the present invention, wherein.

DETAILED DESCRIPTION OF THE INVENTION

The present invention will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

An LCD according to an exemplary embodiment of the present invention now will be described in detail with reference to the drawings.

Figure 1:
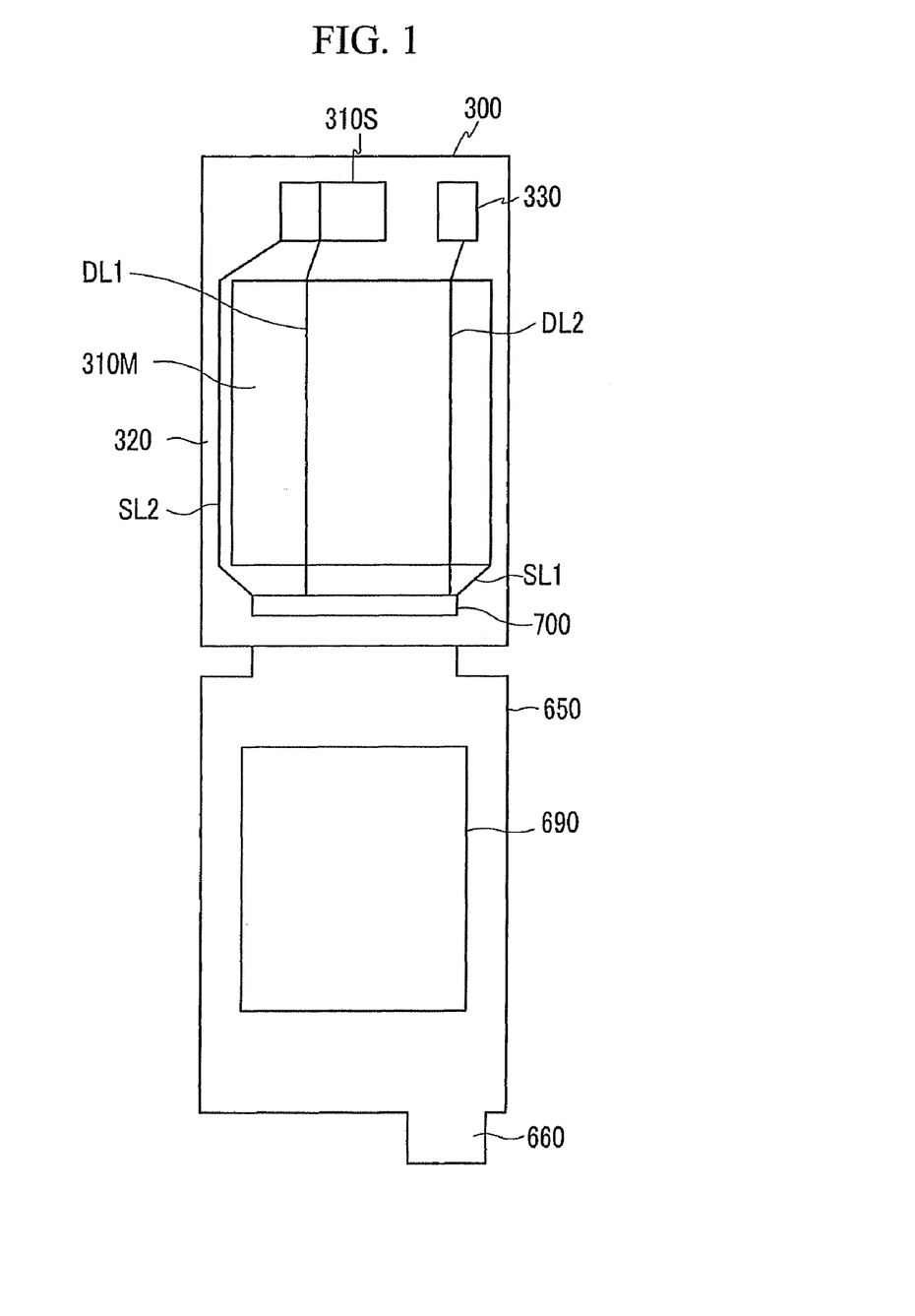
FIG. 1 is a schematic diagram of an exemplary LCD according to an exemplary embodiment of the present invention.
Figure 2:
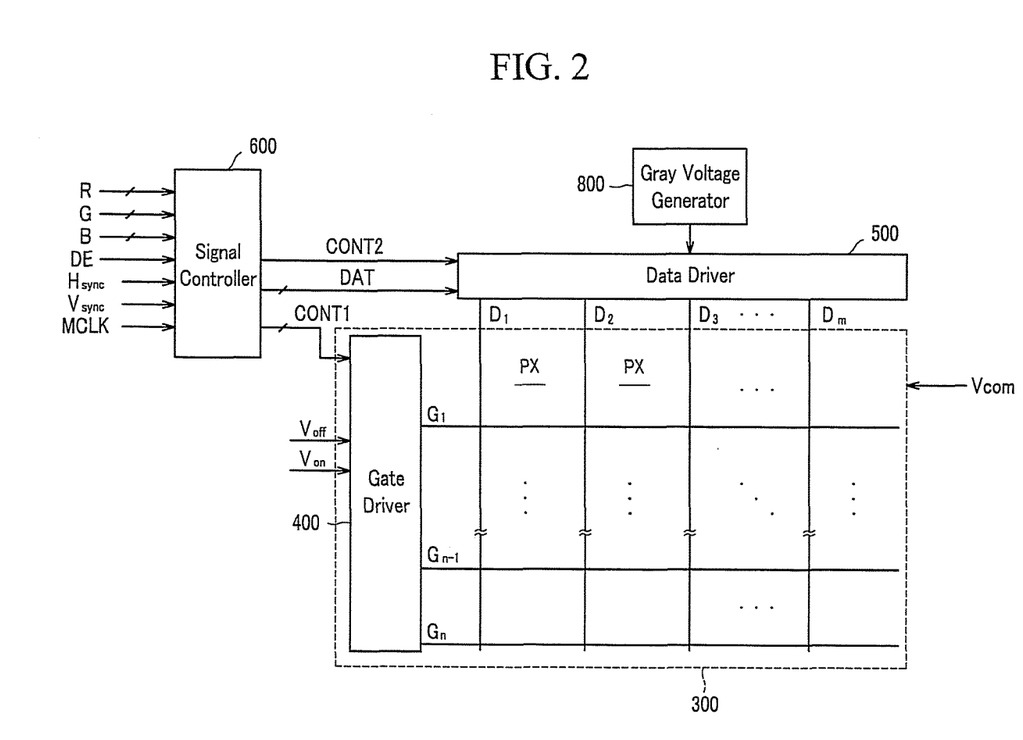
FIG. 2 is a block diagram of an exemplary LCD according to an exemplary embodiment of the present invention.
Figure 3:
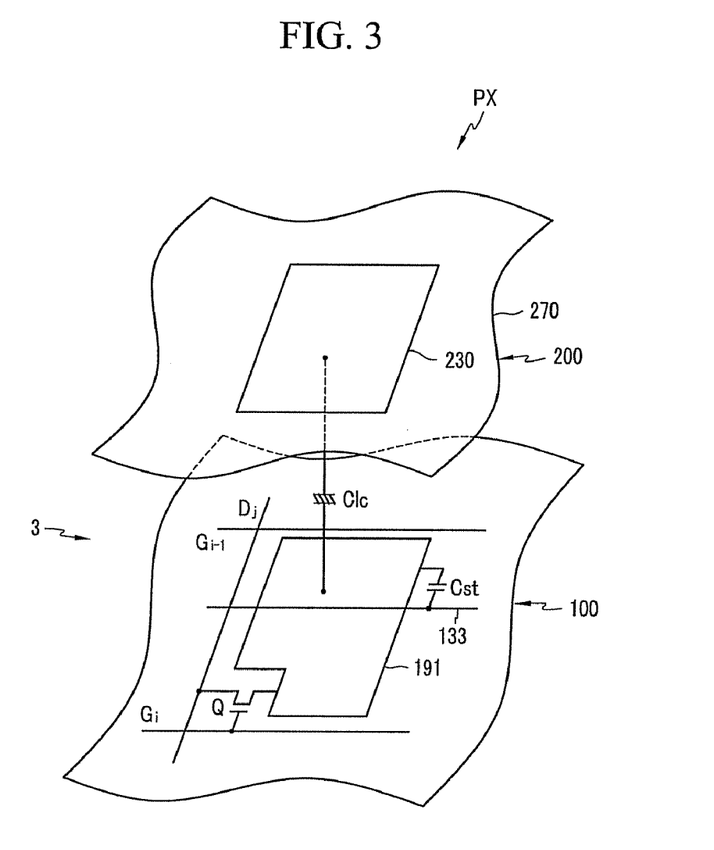
FIG. 3 is an equivalent circuit diagram of an exemplary pixel of the exemplary LCD shown in FIG. 1.

FIG. 1 is a schematic diagram of an exemplary LCD according to an exemplary embodiment of the present invention, FIG. 2 is a block diagram of an exemplary LCD according to an exemplary embodiment of the present invention, and FIG. 3 is an equivalent circuit diagram of an exemplary pixel of the exemplary LCD shown in FIG. 1.

Referring to FIG. 1, an LCD according to an exemplary embodiment of the present invention includes a display panel 300, a flexible printed circuit ("FPC") film 650 attached to the display panel 300, and an integration chip 700 mounted on a main display area 310M.

The FPC 650 is attached near or on one side of the display panel 300. The FPC 650 has an opening 690 where a portion of the display panel 300 is exposed when the FPC 650 is bent or folded in a front or rear direction. On the lower side of the opening 690, such as a side of the FPC 650 opposite to the side of the FPC 650 connected to the display panel 300, the FPC 650 includes an input unit 660 to which external signals are input, and a plurality of signal lines (not shown) for electrically connecting the input unit 660 to the integration chip 700 and the integration chip 700 to the display panel 300. The signal lines have large widths at points where the signal lines are connected to the integration chip 700 and at points where the signal lines are connected to the display panel 300 so as to form pads (not shown).

The display panel 300 includes first and second display areas displaying images, that is, the main display area 310M and a subsidiary display area 310S, a dummy pixel unit 330 disposed on a side of the subsidiary display area 310S, and a peripheral area 320. The peripheral area 320 may include a light blocking layer (not shown) (also called "a black matrix"). The two display areas 310M and 310S form a screen. The FPC 650 is attached to the peripheral area 320, and the dummy pixel unit 330 is also arranged on the peripheral area 320.

As shown in FIG. 2, the display panel 300 includes a plurality of display signal lines including a plurality of gate lines $G_1$ to $G_n$ and a plurality of data lines $D_1$ to $D_m$, and a plurality of pixels PX that are connected to the display signal lines and are arranged substantially in a matrix. Most of the pixels PX and the display signal lines $G_1$ to $G_n$ and $D_1$ to $D_m$ are positioned in the display areas 310M and 310S.

Further, as shown in FIG. 1, some of the data lines $D_1$ to $D_m$ of the display panel 300 are connected to the subsidiary display area 310S. In other words, an example in which the main and subsidiary display areas 310M and 310S share some of the data lines $D_1$ to $D_m$ is shown in FIG. 1, and one of the shared data lines is indicated by DL1 in FIG. 1. The remaining data lines of the data lines $D_1$ to $D_m$ are connected to the dummy pixel unit 330, and one of the remaining data lines of the data lines $D_1$ to $D_m$ is indicated by DL2 in FIG. 1.

The main and subsidiary display areas 310M and 310S are supplied with various driving signals such as gate signals through signal lines SL1 and SL2.

Referring to FIG. 3, the display panel 300 includes a lower panel 100, an upper panel 200, and a liquid crystal ("LC") layer 3 interposed therebetween. Each pixel PX of the display panel 300, for example a pixel PX connected to the i-th gate line $G_i$ (i=1, 2, ..., n) and the j-th data line $D_j$ (j=1, 2, ..., m), includes a switching element Q connected to the signal lines $G_i$ and $D_j$, and an LC capacitor Clc and a storage capacitor Cst that are connected to the switching element Q. In alternative exemplary embodiments, the storage capacitor Cst may be omitted.

The switching element Q is disposed on the lower panel 100 and has three terminals, i.e., a control terminal, such as a gate electrode, connected to the gate line $G_i$, an input terminal, such as a source electrode, connected to the data line $D_j$, and an output terminal, such as a drain electrode, connected to the LC capacitor Clc and the storage capacitor Cst.

The LC capacitor Clc includes a pixel electrode 191 disposed on the lower panel 100 and a common electrode 270 disposed on the upper panel 200 as two terminals. The LC layer 3 disposed between the two electrodes 191 and 270 functions as a dielectric of the LC capacitor Clc. The pixel electrode 191 is connected to the switching element Q, and the common electrode 270 is supplied with a common voltage Vcom and covers an entire surface, or substantially an entire surface, of the upper panel 200. In alternative exemplary embodiments, unlike in FIG. 3, the common electrode 270 may be provided on the lower panel 100, and at least one of the electrodes 191 and 270 may have a shape of a bar or a stripe.

The storage capacitor Cst is an auxiliary capacitor for the LC capacitor Clc. The storage capacitor Cst includes the pixel electrode 191 and a storage electrode line 133, which is provided on the lower panel 100, overlaps the pixel electrode 191 via an insulator, and is supplied with a predetermined voltage such as the common voltage Vcom. In alternative exemplary embodiments, the storage capacitor Cst includes the pixel electrode 191 and an adjacent gate line called a previous gate line, which overlaps the pixel electrode 191 via an insulator.

For color display, each pixel uniquely represents one color in a set of colors (i.e., spatial division) or each pixel sequentially represents the colors in turn (i.e., temporal division) such that a spatial or temporal sum of the colors is recognized as a desired color. An example of a set of colors may include primary colors, and may include red, green, and blue. FIG. 3 shows an example of the spatial division in which each pixel includes a color filter 230 representing one of the colors in an area of the upper panel 200 facing the pixel electrode 191. In alternative exemplary embodiments, the color filter 230 is provided on or under the pixel electrode 191 on the lower panel 100.

One or more polarizers (not shown) are attached to the display panel 300. For example, first and second polarized films may be disposed on the lower and upper panels 100, 200, respectively, and may adjust a transmission direction of light externally provided into the panels 100, 200, in accordance with an aligned direction of the LC layer 3. The first and second polarized films may have first and second polarized axes thereof substantially perpendicular to each other.

Referring to FIG. 2 again, a gray voltage generator 800 generates a full number of gray voltages or a limited number of gray voltages (referred to as "reference gray voltages" hereinafter) related to the transmittance of the pixels PX. Some of the (reference) gray voltages have a positive polarity relative to the common voltage Vcom, while the other of the (reference) gray voltages have a negative polarity relative to the common voltage Vcom.

A gate driver 400 is connected to the gate lines $G_1$-$G_n$ of the display panel 300, and synthesizes a gate-on voltage Von and a gate-off voltage Voff to generate the gate signals for application to the gate lines $G_1$-$G_n$.

A data driver 500 is connected to the data lines $D_1$-$D_m$ of the display panel 300 and applies data voltages, which are selected from the gray voltages supplied from the gray voltage generator 800, to the data lines $D_1$-$D_m$. However, when the gray voltage generator 800 generates only a few of the reference gray voltages rather than all the gray voltages, the data driver 500 may divide the reference gray voltages to generate the data voltages from among the reference gray voltages.

A signal controller 600 controls the gate driver 400, the data driver 500, etc.

The integration chip 700, as shown in FIG. 1, is supplied with signals from the outside through signal lines (not shown) that are formed on the input unit 660 and the FPC 650, and applies processed signals to the main display area 310M and subsidiary display area 310S through wires (not shown) formed on the peripheral area 320 of the display panel 300 and thereby controls the display areas 310M and 310S. The integration chip 700 may include the gate driver 400, the gray voltage generator 800, the data driver 500, the signal controller 600 shown in FIG. 2, etc.

Now, the operation of the above-described LCD will be described in detail.

The signal controller 600 is supplied with input image signals R, G, and B and input control signals for controlling the display thereof from an external graphics controller (not shown). The input image signals R, G, and B contain luminance information of pixels PX, and the luminance has a predetermined number of grays, for example 1024 ($=2^{10}$), 256 ($=2^8$), or 64 ($=2^6$) grays. The input control signals include a vertical synchronization signal Vsync, a horizontal synchronization signal Hsync, a main clock signal MCLK, and a data enable signal DE.

On the basis of the input control signals and the input image signals R, G, and B, the signal controller 600 generates gate control signals CONT1 and data control signals CONT2 and processes the image signals R, G, and B to be suitable for the operation of the display panel 300 and the data driver 500. The signal controller 600 sends the gate control signals CONT1 to the gate driver 400 and sends the processed image signals DAT and the data control signals CONT2 to the data driver 500.

The gate control signals CONT1 include a scanning start signal STV for instructing to start scanning and at least one clock signal for controlling the output period of the gate-on voltage Von. The gate control signals CONT1 may further include an output enable signal OE for defining the duration of the gate-on voltage Von.

The data control signals CONT2 include a horizontal synchronization start signal STH for informing a start of data transmission for a row of pixels PX, a load signal LOAD for instructing to apply the data voltages to the data lines $D_1$-$D_m$, and a data clock signal HCLK. The data control signal CONT2 may further include an inversion signal RVS for reversing the polarity of the data voltages (relative to the common voltage Vcom).

Responsive to the data control signals CONT2 from the signal controller 600, the data driver 500 receives a packet of the digital image signals DAT for the row of pixels PX from the signal controller 600, converts the digital image signals DAT into analog data voltages selected from the gray voltages from the gray voltage generator 800, and applies the analog data voltages to the data lines $D_1$-$D_m$.

The gate driver 400 applies the gate-on voltage Von to a gate line $G_1$-$G_n$ in response to the gate control signals CONT1 from the signal controller 600, thereby turning on the switching transistors Q connected thereto. The data voltages applied to the data lines $D_1$-$D_m$ are then supplied to the pixels PX through the activated switching transistors Q.

A difference between a data voltage and the common voltage Vcom applied to a pixel PX is represented as a voltage across the LC capacitor Clc of the pixel PX, which is referred to as a pixel voltage. The LC molecules in the LC capacitor Clc have orientations depending on the magnitude of the pixel voltage, and the molecular orientations determine the polarization of light passing through the LC layer 3. The polarizer(s) converts light polarization to light transmittance such that the pixel PX has a luminance represented by a gray of the data voltage.

By repeating this procedure by a unit of a horizontal period (which is also referred to as "1H" and is equal to one period of the horizontal synchronization signal Hsync and the data enable signal DE), all gate lines $G_1$-$G_n$ are sequentially supplied with the gate-on voltage Von, thereby applying the data voltages to all pixels PX to display an image for a frame.

When the next frame starts after one frame finishes, the inversion signal RVS applied to the data driver 500 is controlled such that the polarity of the data voltages is reversed (which is referred to as "frame inversion"). The inversion signal RVS may also be controlled such that the polarity of the data voltages flowing in a data line $D_1$-$D_m$ are periodically reversed during one frame (for example, row inversion and dot inversion), or the polarity of the data voltages in one packet are reversed (for example, column inversion and dot inversion).

Figure 4:
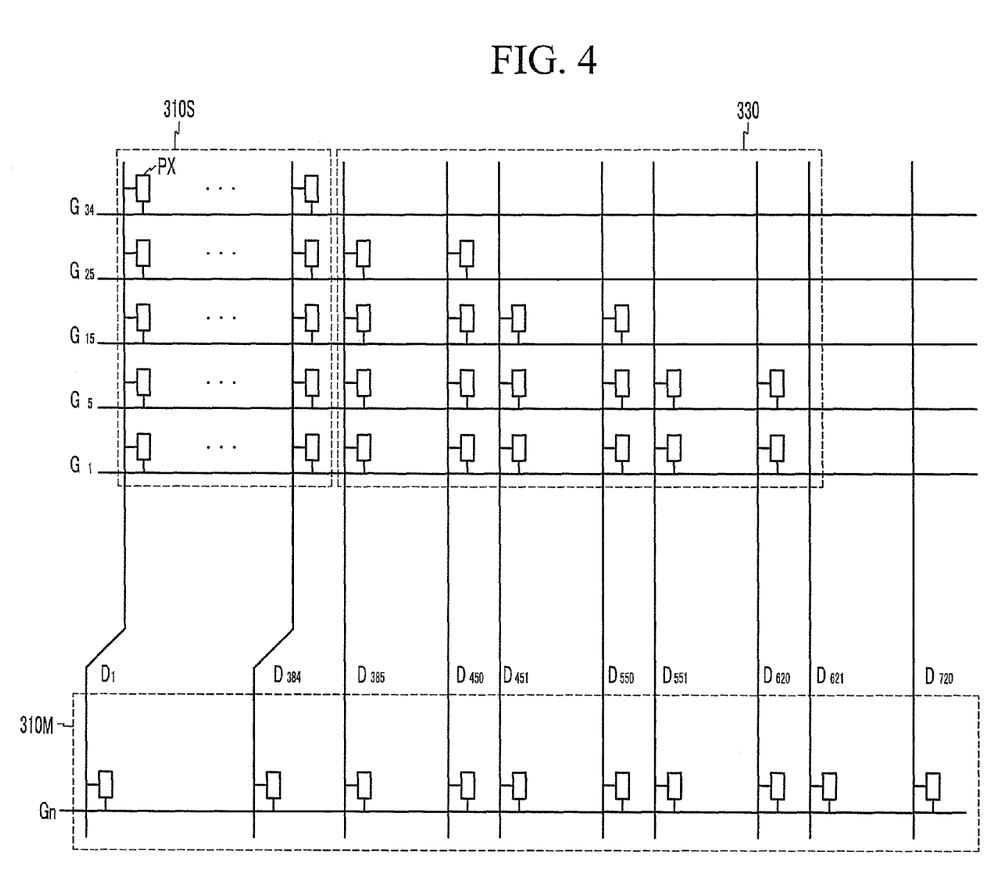
FIG. 4 is a layout view of an example of a dummy pixel unit of an exemplary LCD according to an exemplary embodiment of the present invention.

Referring to FIG. 4, an example of the subsidiary display area of an exemplary LCD according to an exemplary embodiment of the present invention will be described in detail.

FIG. 4 is a layout view of an example of a dummy pixel unit of an exemplary LCD according to an exemplary embodiment of the present invention.

In this embodiment, as an example, the number of data lines in the display panel is about 720, and the number of gate lines in the subsidiary display area 310S is about 34.

Referring to FIG. 4, in the illustrated exemplary embodiment, the main display area 310M and the subsidiary display area 310S share about 384 $D_1$-$D_{384}$ of all the data lines $D_1$-$D_{720}$. The remaining data lines $D_{385}$-$D_{720}$ are connected to the dummy pixel unit 330.

Furthermore, the gate lines $G_1$-$G_{34}$ of the subsidiary display area 310S extend from the subsidiary display area 310S to the dummy pixel unit 330.

Dummy pixels PX arranged on the dummy pixel unit 330 have the same construction as those arranged on the main display area 310M and the subsidiary display area 310S. That is, the dummy pixels PX have the construction shown in FIG. 3, and thus the dummy pixels PX are denoted by the same drawing reference indicia. In addition, the pixels PX formed on the main display area 310M and the subsidiary display area 310S, and on the dummy display area 330, are represented by a rectangular shape.

The dummy pixels PX arranged on the dummy pixel unit 330 are divided into several groups, such as a dummy pixel group connected to a first gate line to a twenty-fifth gate line $G_1$-$G_{25}$ and the data lines $D_{385}$-$D_{450}$, a dummy pixel group connected to the first gate line to a fifteenth gate line $G_1$-$G_{15}$ and the data lines $D_{451}$-$D_{550}$, and a dummy pixel group connected to the first gate line to a fifth gate line $G_1$-$G_5$ and the data lines $D_{551}$-$D_{620}$. There are no dummy pixels PX connected to the remaining data lines $D_{621}$-$D_{720}$.

That is, in the dummy pixel unit 330, as a distance from the subsidiary display area 310S increases, the number of the dummy pixels formed on each dummy pixel group is gradually reduced. In other words, since the number of dummy pixels PX connected to the data lines $D_{385}$-$D_{720}$ gradually decreases with respect to an increasing distance from the subsidiary display area 310S, a load amount applied to the data lines $D_{385}$-$D_{720}$ is gradually decreased such that a vertical line defect is reduced that would otherwise occur due to a rapid load difference between the data lines $D_{385}$-$D_{720}$.

In addition, while a particular example has been illustrated and described, the number of data lines connected to each pixel group is not fixed, and may be varied if the load amount applied to the data lines is gradually decreased.

Figure 5:
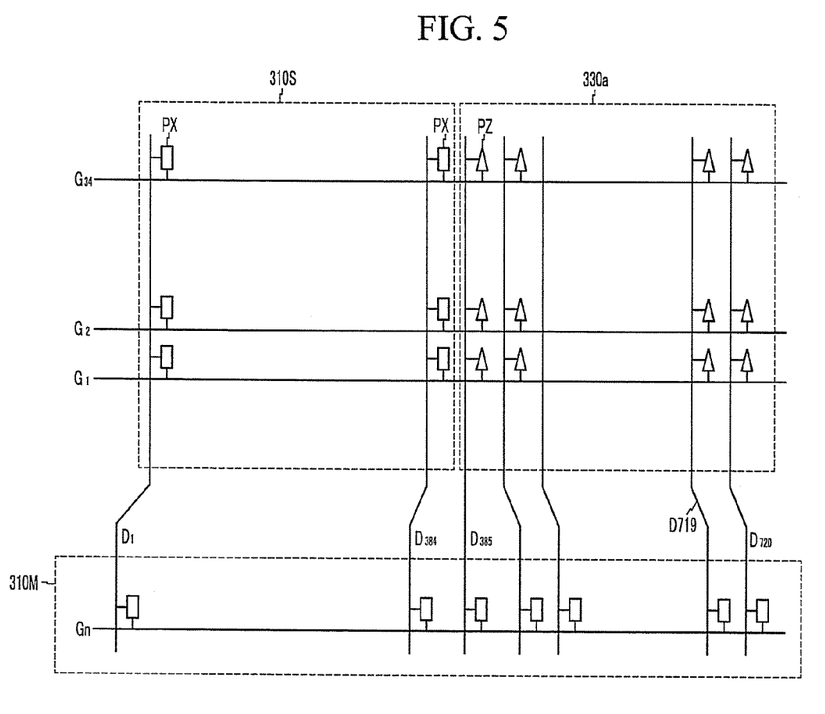
FIG. 5 is a layout view of another example of a dummy pixel unit of an exemplary LCD according to of an exemplary embodiment of the present invention.
Figure 6:
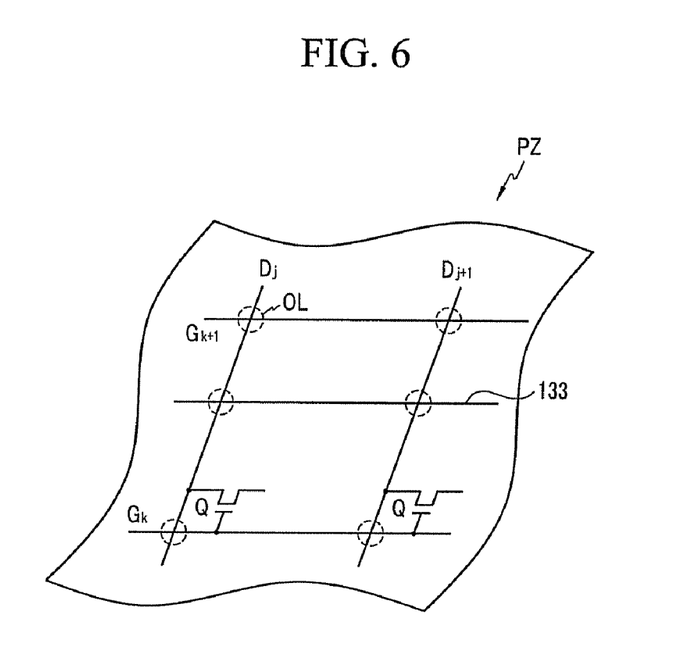
FIG. 6 is an equivalent circuit diagram of an exemplary dummy pixel shown in FIG. 5.

Referring to FIGS. 5 and 6, another example of the dummy pixel unit 330a of an exemplary LCD according to an exemplary of the present invention will be described in detail. The LCD of this example has substantially the same construction as that shown in FIGS. 1 to 4, except for the dummy pixel unit 330a, and thereby detailed descriptions of the same elements are omitted.

FIG. 5 is a layout view of another example of a dummy pixel unit of an exemplary LCD according to of an exemplary embodiment of the present invention, and FIG. 6 is an equivalent circuit diagram of an exemplary dummy pixel shown in FIG. 5.

Referring to FIG. 5, the main display area 310M and the subsidiary display area 310S share the data lines $D_1$-$D_{384}$, and the remaining data lines $D_{385}$-$D_{720}$ are connected to the dummy pixel unit 330a.

In this example, the construction of the dummy pixels PZ of the dummy pixel unit 330a is different from that of the dummy pixels PX of the dummy pixel unit 330 shown in FIG. 4, and thereby the dummy pixels PZ are represented by a triangular shape. As compared to the pixel PX shown in FIG. 3, the dummy pixel PZ does not include a pixel electrode, as shown in FIG. 6.

In FIG. 6, most of a load applied to the data lines data line $D_j$ and $D_{j+1}$ occurs at overlapping regions OL of the data lines $D_j$ and $D_{j+1}$, and the gate lines $G_k$ and $G_{k+1}$ and at overlapping regions OL of the data lines $D_j$ and $D_{j+1}$ and the storage electrode line 133. Thereby, since the dummy pixel unit 330a does not include pixel electrodes, the data lines $D_{385}$-$D_{720}$ connected to the dummy pixel unit 330a are applied with the same load as that applied to the data lines $D_1$-$D_{384}$ connected to the subsidiary display area 310S. Thus, a vertical line defect is reduced due to adjacent data lines $D_{385}$-$D_{720}$ that extend to the dummy pixel unit 330a.

Since each dummy pixel PZ does not include the pixel electrode, a line width between two adjacent data lines $D_{385}$-$D_{720}$ is reduced such that a size of the peripheral area 320 for forming the dummy pixel unit 330a increases.

According to these exemplary embodiments, since a load difference between the data lines connected to the subsidiary display area and the data lines connected to the dummy display area is reduced or is substantially the same, a vertical line defect decreases.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first display area;
a second display area;
a peripheral area outside of the first and second display areas; and
a dummy pixel unit formed on the peripheral area;
wherein the first and second display areas comprise a plurality of pixels arranged in a matrix each of which has a switching element, and data lines and gate lines connected to the pixels, and
the data lines comprise a first data line group positioned on the first and second display areas and a second data line group positioned on the first display area and the dummy pixel unit,
wherein the dummy pixel unit comprises dummy pixels connected to the gate lines of the second display area and to the data lines of the second data line group, and
wherein the second data line group comprises a plurality of sub-data line groups each of which has a number of dummy pixels that is different from other sub-data line groups, and as a distance between the first data line group and a sub-data line group increases, the number of dummy pixels within a respective sub-data line group is gradually reduced.

2. The liquid crystal display of claim 1, wherein an entirety of the gate lines of the second display area extend to the dummy pixel unit.

3. The liquid crystal display of claim 1, wherein a farthest sub-data line group from the first data line group is not connected to the dummy pixels.

4. The liquid crystal display of claim 3, wherein each dummy pixel has a same construction as the pixels of the first and second display areas.

5. The liquid crystal display of claim 1, wherein the pixels of the first and second display areas further comprise a pixel electrode connected to the switching element, and a storage electrode line transmitting a common voltage.

6. The liquid crystal display of claim 5, wherein the dummy pixels comprise a switching element connected to a gate line of the second display area and a data line of the second data line group, and a storage electrode line transmitting the common voltage.

7. The liquid crystal display of claim 6, wherein the switching element of the dummy pixels is not connected to a pixel electrode.

8. The liquid crystal display of claim 6, wherein a distance between adjacent data lines of the second data line group of the dummy pixel unit is narrower than a distance between adjacent data lines of the second data line group of the first display area or between adjacent data lines of the first data line group of the second display area.

9. The liquid crystal display of claim 1, further comprising a display panel, and a driving chip is attached on the display panel.

10. The liquid crystal display of claim 9, further comprising a data driver transmitting data signals to the first and second data line groups; and
a gate driver transmitting a gate signal to the gate lines.

11. The liquid crystal display of claim 10, wherein the driving chip comprises the data driver and the gate driver.

12. The liquid crystal display of claim 1, wherein a load difference between the first data line group and the second data line group is substantially reduced by the dummy pixel unit.

13. A display device comprising:
a first display area;
a second display area distinct from the first display area;
a peripheral area surrounding the first and second display areas;
a dummy pixel unit formed on the peripheral area; and,
a plurality of data lines including a first data line group extending across the first and second display areas and a second data line group extending across the first display area and the dummy pixel unit;
wherein the dummy pixel unit reduces a load difference between the first data line group and the second data line group,
the dummy pixel unit comprises dummy pixels connected to the gate lines of the second display area and to the data lines of the second data line group, and
wherein the second data line group comprises a plurality of sub-data line groups each of which has a number of dummy pixels that is different from other sub-data line groups, and as a distance between the first data line group and a sub-data line group increases, the number of dummy pixels within a respective sub-data line group is gradually reduced.

14. The display device of claim 13, wherein a load applied to the first data line group is substantially equal to a load applied to the second data line group.

15. A method of reducing a vertical line defect in a display device having a first display area and a second display area, the method comprising:

extending a first data line group across the first display area and the second display area;
extending a second data line group across the first display area and a dummy pixel unit;
arranging dummy pixels within the dummy pixel unit; and
substantially minimizing a load difference between the first data line group and the second data line group using the dummy pixel unit,
wherein the dummy pixels are connected to gate lines of the second display area and data lines of the second data line group, and
wherein the second data line group comprises a plurality of sub-data line groups each of which has a number of dummy pixels that is different from other sub-data line groups, and as a distance between the first data line group and a sub-data line group increases, the number of dummy pixels within a respective sub-data line group is gradually reduced.

16. The method of claim 15, wherein the dummy pixels do not include pixel electrodes.

* * * * *